United States Patent [19]

Martin et al.

[11] Patent Number: 4,731,263

[45] Date of Patent: Mar. 15, 1988

[54] METHOD FOR THE PREPARATION OF IONOMER FILMS

[75] Inventors: Charles R. Martin, Bryan; Robert B. Moore, III, College Station, both of Tex.

[73] Assignee: The Dow Chemical Company, Midland, Mich.

[21] Appl. No.: 912,701

[22] Filed: Sep. 26, 1986

[51] Int. Cl.$^4$ ............................................. B05D 3/02
[52] U.S. Cl. ................... 427/385.5; 427/243; 427/244; 427/388.1; 427/389.8; 427/389.9; 427/393.6
[58] Field of Search ............... 427/385.5, 389.7, 389.8, 427/389.9, 213, 244, 393.6, 388.1

[56] References Cited

U.S. PATENT DOCUMENTS

| | | | |
|---|---|---|---|
| 3,282,875 | 11/1966 | Connolly et al. | 260/29.6 |
| 3,909,378 | 9/1975 | Walmsley | 204/98 |
| 4,025,405 | 5/1977 | Dotson et al. | 204/98 |
| 4,065,366 | 12/1977 | Oda et al. | 204/98 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,132,819 | 1/1979 | Giuffré et al. | 427/341 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Munekata et al. | 560/183 |
| 4,212,713 | 7/1980 | Suhara et al. | 204/98 |
| 4,251,333 | 2/1981 | Suhara et al. | 204/98 |
| 4,270,996 | 6/1981 | Suhara et al. | 204/98 |
| 4,277,344 | 7/1981 | Cadotte | 210/654 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 F |
| 4,340,680 | 7/1982 | Asawa et al. | 521/27 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,417,969 | 11/1983 | Ezzell et al. | 204/252 |
| 4,433,082 | 2/1984 | Grot | 524/755 |
| 4,434,116 | 2/1984 | Covitch | 264/49 |
| 4,453,991 | 6/1984 | Grot | 427/389.9 X |
| 4,462,877 | 7/1984 | Ezzell | 204/98 |
| 4,470,889 | 9/1984 | Ezzell et al. | 204/98 |
| 4,478,695 | 10/1984 | Ezzell et al. | 204/98 |

FOREIGN PATENT DOCUMENTS

| | | |
|---|---|---|
| 27009 | 4/1981 | European Pat. Off. . |
| 66369 | 12/1982 | European Pat. Off. . |
| 1602085 | 11/1981 | United Kingdom . |

OTHER PUBLICATIONS

"Electrochemical, IR and XPS Study of Nafion Films Prepared from Hexamethylphosphortriamide Solution", Weber et al, *J. Electroanal. Chem.*, 199 (1986), pp. 81–92.

"Dissolution of Perfluorinated Ion Containing Polymers", Martin et al, *Anal. Chem.*, 54, 1982, pp. 1639–1641.

"Ionomer", Ward, Jr., *Modern Plastics Encyclopedia*, 1976–1977, pp. 32–33.

"Study of Nafion Films on Electrodes Prepared from Dimethylacetamide Solution", Weber et al, *J. Electroanal. Chem.*, 200 (1986), pp. 379–381.

*Primary Examiner*—Thurman K. Page

[57] ABSTRACT

The invention is a method for forming a perfluorosulfonate ionomer film comprising:

(a) forming a solution of a perfluorosulfonate ionomer in its salt form;

(b) coating a substrate with the perfluorosulfonate ionomer solution; and (c) heating the coated substrate to a temperature of at least about 120° C. for sufficient time to deposit a solvent-resistant film of a perfluorosulfonate ionomer onto the substrate.

20 Claims, No Drawings

METHOD FOR THE PREPARATION OF IONOMER FILMS

BACKGROUND OF THE INVENTION

Perfluorosulfonate ionomers (PFSI's) such as E. I. duPont de Nemours & Co.'s Nafion polymer, are proving to be versatile membrane materials in a variety of applications. For example, PFSI's have been used in electrochemical processes and devices including chloralkali cells, batteries, fuel cells, and water electrolyzers. However, many applications require PFSI's to be formed into films. This is frequently accomplished through dissolving the PFSI in a solvent, depositing the solution onto a substrate, and removing the solvent. High-temperature, high-pressure procedures for dissolving PFSI membranes has recently been reported in U.S. Pat. No. 4,433,082 and in an article by C. R. Martin; T. A. Rhoades, and J. A. Ferguson, *Anal. Chem.*, 1982, 54, 1639. Using such procedures, solutions of PFSI have been formed and used to prepare PFSI-coated electrodes, catalysts, and high performance liquid chromatography packing materials. However, such methods do not produce a film that is entirely satisfactory because its properties are different from the polymer before it was formed into a film.

Any film-forming method used with PFSI's preferably should produce PFSI films which possess the solubility behavior, chemical, mechanical, and thermal stability equivalent to the PFSI material as it was originally produced. For example, films formed by prior art methods, such as those discussed above, are easily dissolved in an ethanol/water mixture, while the original polymer was not so easily dissolved. In addition, the PFSI's cluster-channel morphology is changed when the polymer is formed into a film. The cluster-channel morphology is important because it helps to impede anion transport, which is a desirable property if these films are accomplish the task for which they are being used, i.e., to reject anions. The present invention provides a method which can be used to produce films having properties similar to those of the polymer before they were formed into the film.

References which teach dissolving a PFSI in a high boiling point solvent include: "Electrochemical, IR and XPS Study of Nafion Films Prepared From Hexamethylphosphortriamide Solution", *Journal of Electroanalytical Chemistry*, Volume 199 (1986) pages 81-82; "Study of Nafion Films On Electrodes Prepared From Dimethylacetamide Solution", *Journal of Electroanalytical Chemistry*, Volume 200 (1986) pages 379-381; and U.S. Pat. No. 4,433,082, "Process For Making Liquid Composition of Perfluorinated Ion Exchange Polymer, and Product Thereof", W. G. Grot.

SUMMARY OF THE INVENTION

The invention is a method for forming a perfluorosulfonate ionomer film comprising:

(a) forming a solution of a perfluorosulfonate ionomer in its salt form;

(b) coating a substrate with the perfluorosulfonate ionomer solution; and (c) heating the coated substrate to a temperature of at least about 120° C. for sufficient time to deposit a solvent-resistant film of a perfluorosulfonate ionomer onto the substrate.

DETAILED DESCRIPTION OF THE INVENTION

"Solvent-resistant film" means a film which, after being contacted with a 50:50 volume ratio of an ethanol:water solution at 50° C. for one hour in an ultrasonic bath, and dried is found to have lost less than 8 percent of its weight, and preferably less than 5 percent of its weight.

Perfluorosulfonate ionomers (PFSI) like those described in the following patents are suitable for use in the present invention: U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European patent application No. 0,027,009. Such PFSI's usually have equivalent weight in the range of from about 500 to about 2000.

Particularly preferred for use in the present invention are the PFSI's containing the repeating units formed from the polymerization of monomer I with monomer II (as defined below). Optionally, repeating units can be formed from the inclusion of a third type of monomer during the polymerization of monomer I and monomer II.

The first type of monomer is represented by the general formula:

$$CF_2 = CZZ' \qquad (I)$$

where: Z and Z' are independently selected from the group consisting of —H, —Cl, —F, or —CF$_3$.

The second type of monomer consists of one or more monomers selected from compounds represented by the general formula:

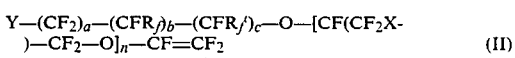
$$Y-(CF_2)_a-(CFR_f)_b-(CFR_{f'})_c-O-[CF(CF_2X)-CF_2-O]_n-CF=CF_2 \qquad (II)$$

where:
Y is selected from the group consisting of —SO$_2$OA;
A is —H$^+$, an alkali metal, or —R$_1$R$_2$R$_3$R$_4$N$^+$;
R$_1$, R$_2$, R$_3$, and R$_4$ are independently selected from the group consisting of —H$^+$, a branched or linear alkyl radical having from 1 to about 10 carbon atoms or an aryl radical;
a is 0-6;
b is 0-6;
c is 0 or 1;
provided a+b+c is not equal to 0;
X is —Cl, —Br, —F, or mixtures thereof when n>1;
n is 0 to 6; and
R$_f$ and R$_{f'}$ are independently selected from the group consisting of —F, —Cl, perfluoroalkyl radicals having from 1 to about 10 carbon atoms and fluorochloroalkyl radicals having from 1 to about 10 carbon atoms.

Particularly preferred as a PFSI for use in the present invention is a polymer having repeating units formed from the monomers shown above where n =0 or 1; R$_f$ and R$_{f'}$ is —F; X is —Cl or —F; and a+b+c equal 2 or 3.

Where A is —H$^+$, it is desirable to convert A to its salt form by reacting it with an appropriate base, e.g. sodium hydroxide or potassium hydroxide. Preferably, A is converted to an alkali metal, particularly —ONa$^-$ or —OK³¹ by reacting the PFSI with a sodium hydroxide or potassium hydroxide aqueous solution, respectively. Such conversions are well known to those skilled in the art.

It has been discovered, the H⁺-form PFSI's tend to char when heated to temperatures above about 120° C. thus, the hydrogen form of a PFSI degrades during the removal of the solvent.

The third repeating unit which may optionally be present in the polymer may be an unsaturated perfluoroalkyl monomer other than those represented by the general formula I, above. Particularly preferred is a repeating unit selected from the compounds represented by the general formula:

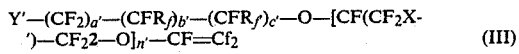
(III)

where:
Y' is —F, —Cl or —Br;
a' and b' are independently 0—3;
c is 0 or 1;
provided a'+b'+c' is not equal to 0;
n' is 0–6;
$R_f$ and $R_f'$ are independently selected from the group consisting of —Br, —Cl, —F, perfluoroalkyl radicals having from about 1 to about 10 carbon atoms, and chloroperfluoroalkyl radicals having from 1 to about 10 carbon atoms; and
X' is —F, —Cl, —Br, or mixtures thereof when n' > 1.

Forming a solution of a PFSI in its salt form may be accomplished by contacting the PFSI with one or more of a particular group of solvents. Solvents which are useful in the present invention include solvents having a boiling point above about 120° C. which have a solubility parameter in the range of from about 10 to about 16. Preferably, the solvent is a polar aprotic solvent such as N,N'-dimethylformamide (DMF), dimethylsulfoxide (DMSO), N-methyl pyrrolidone, tetramethyl urea, triphenylphosphate, dimethylacetamide, sulfolane, butyrolactone and the like. In addition, ethylene glycol may be used as the solvent, although it is not preferred because very high evaporating temperatures are required and they tend to decompose the polymer. It has been discovered that the use of water to enhance the dissolution of the PFSI is unnecessary for the redissolution of the PFSI using the solvent, although it may, optionally, be used.

The dissolution can be conducted at ambient temperature and pressure, although elevated temperatures and pressures may, optionally, be used. Stirring or agitation in an ultrasonic bath may be used to enhance the rate of dissolution. The particular temperature and the time used to dissolve the PFSI in the second solvent is not critical to the successful practice of the invention.

Typically, the PFSI solutions formed according to the procedure of the present invention have a weight/volume (w/v %) percent of from about 0.01 to about 8 percent by weight of PFSI. Preferably, the perfluorosulfonate ionomer in the solution has a concentration of from about 0.5 to about 3 w/v %. However, for the formation of films according to the present invention, the actual concentration of the PFSI in the solution is not critical. Although it might be necessary, when working with low-concentration solutions, to use more than one coating of the solution on the substrate to form a continuous film. However, if non-continuous films are acceptable, a one-coat layer of the solution might be sufficient.

Along with the solvents listed above, it is acceptable to use co-solvents. The solvent/co-solvent mixture must, however, be able to solvate the ionic portion of the PFSI, while plasticizing the non-ionic (fluorocarbon) portion of the PFSI, if a good film is to be formed. The co-solvent can contribute to either of these functions. Materials suitable for use as a co-solvent are one or more solvents selected from the group consisting of $C_1$ to $C_{12}$ alcohols, 2-methoxyethanol, 2-ethoxyethanol, ethylene glycol dimethyl ether, ethylene glycol diethyl ether, diethylene glycol dimethyl ether, diethylene glycol diethyl ether, dioxane, and acetonitrile.

After dissolving the PFSI in the solvent or the solvent/co-solvent mixture to form a solution, the solution is contacted with the substrate upon which it is desired to have a PFSI film deposited. The solution may be coated onto the substrate by dipping the substrate into the solution, by painting or spraying the solution onto the substrate, or by a variety of other processes well-known in the art.

The substrate itself can be any of a wide variety of materials, including a fabric (especially a fabric made at least in part of perhalocarbon fibers or glass fibers), an ion exchange membrane, or a porous diaphragm, in this latter case for the purpose of converting the porous diaphragm to a nonporous membrane-like article. The coated articles so made can be used in various liquid permeation processes, such as reverse osmosis, ultrafiltration, and electrolysis, especially electrolysis of aqueous sodium chloride solution.

The solution can also be used to coat catalyst supports, such as metals or ceramics. Such catalysts are useful in catalyzing alkylations, ether formations, and a host of other acid catalyzed chemical reactions. Other substrates are described in U.S. Pat. No. 4,277,344, "Interfacially Synthesized Reverse Osmosis Membrane". There, a variety of organic polymeric materials are used as substrates including polysulfone, chlorinated polyvinyl chloride, polyvinyl butyral, polystyrene, and cellulose esters. The substrate can be microporous so as to have millions of pores per square centimeter. Typical pore sizes range from about 1 to about 1000 millimicrons in their widest dimension.

After the solution has been coated onto the desired substrate, the solvent or solvent/co-solvent mixture is removed from the solution, thereby precipitating the PFSI onto the substrate. However, it has been discovered that solvent-resistant films are formed only when the solvent is removed from the solution by heating the solution to temperatures greater that about 120° C.

It has further been discovered that the higher the solubility parameter of the solvent, the higher the processing temperature should be for removing the solvent. For example, when DMF is used as the solvent, it is optimal to heat the solution to a temperature range of from about 120° C. to about 165° C. for the removal of the DMF. Most preferably, the DMF is removed at a temperature of about 165° C. DMF has a solubility parameter of 12.1 Hildebrands (Hb). Likewise, when DMSO is used as the solvent, it is optimal to heat the solution to a temperature range of from about 165° C. to about 185° C. for removal of the DMSO. DMSO has a solubility parameter of 12.9 Hb. Similarly, when ethylene glycol is used as the solvent, it is optimal to heat the solution to a temperature range of from about 180° C. to about 190° C. Ethylene glycol has a solubility parameter of 16.3 Hb.

It is a further feature of the invention that a portion of the solvent from the coating solution on the substrate can be removed at moderate temperatures with reduced pressures, provided such preliminary drying is followed by sufficient drying at elevated temperatures to produce a solvent resistant film.

Although the reasons for the formation of films having properties similar to the polymers as originally produced is not entirely understood, it is thought that it is related to the amount of crystallinity and to the formation of ionic clusters in the PFSI. Films which show poor physical and mechanical characteristics have been found to show distinctly different x-ray scattering spectra than both films prepared according to the present invention, and PFSI films obtained from hydrolysis of the thermoplastic precursors.

EXAMPLE 1

This example shows the use of the invention on an PFSI using dimethylsulfoxide as the solvent.

A 0.5 gram sample of a sulfonic acid type PFSI in its proton form having an equivalent weight of about 1286 was contacted with about 89.3 grams of a 50:50 ethanol:water mixture at a temperature of about 250° C. at a pressure of about 800 pounds per square inch to dissolve the PFSI, thereby forming a first solution. The PFSI solution was then filtered through a Whatman #1 paper filter to remove any undissolved polymer. This produced a solution having a 0.445 weight/volume percent.

The solution was then neutralized by adding about 8.1 grams of a 0.05 Molar NaOH solution to convert the PFSI into its sodium form. It was then heated to about 60° C. and maintained at that temperature for a time sufficient for the solvent to substantially completely evaporate, thereby forming a brittle film. The PFSI film was then removed and ground at room temperature into a fine white powder.

The method of the present invention was then used to form the polymer into a film. A 50 milligram sample of the PFSI powder prepared above was added to 10 milliliters of DMSO and then agitated in an ultrasonic bath for about 30 minutes to promote dissolution of the polymer. The temperature of the PFSI solution rose to about 40° C. during this procedure.

The DMSO was then substantially completely evaporated at a temperature of about 185° C. leaving the PFSI behind in the form of a film in the evaporation container. The PFSI film was clear, pliant, mechanically stable and could be removed from the walls of the evaporation vial as a coherent membrane.

The solubility of the PFSI film was assessed quantitatively by immersion of the solution processed film in 10 milliliters of a 50:50 ethanol:water solution with agitation from an ultrasonic bath for 1 hour. (Ultrasonication caused the temperature of the ethanol:water solvent to rise to about 50° C.) The solvent was then filtered through a Whatman #1 filter and evaporated to dryness. The solid residue was weighed and the percent (w/w) of the solution processed PFSI which was soluble was calculated to be about 3.5%.

EXAMPLE 2

This example shows the invention used on Nafion PFSI and using dimethylsulfoxide as the solvent.

A 0.5 gram sample of a sulfonic acid Nafion perfluorosulfonate ionomer (proton form) having an equivalent weight of about 1100 was contacted with about 89.3 grams of a 50:50 ethanol:water mixture at a temperature of about 250° C. at a pressure of about 800 pounds per square inch to dissolve the PFSI, thereby forming a solution. The PFSI solution was then filtered through a Whatman #1 paper filter to remove any undissolved polymer. This produced a 0.428 w/v % solution of the PFSI.

The solution was then neutralized by adding about 7.8 grams of a 0.05 Molar NaOH solution to convert the PFSI into its sodium form. This solution was heated to about 60° C. allowing the solvent to substantially completely evaporate subsequently forming a brittle film. The PFSI was then removed and ground at room temperature into a fine white powder.

The present invention was then used to prepare the PFSI into a film. A 50 milligram sample of the PFSI powder was added to 10 milliliters of DMSO and then agitated in an ultrasonic bath for about 30 minutes to promote dissolution of the polymer. The temperature of the PFSI solution rose to about 40° C. during this procedure.

The DMSO was substantially completely evaporated at a temperature of about 185° C. leaving the PFSI behind in the evaporation container. The PFSI was in the form of a film which was clear, pliant, mechanically stable and could be removed from the walls of the evaporation vial as a coherent film. The solubility of the PFSI film was assessed quantitatively by immersion of the solution processed film in 10 milliliters of a 50:50 ethanol:water solution with agitation from an ultrasonic bath for 1 hour. (Ultrasonication caused the temperature of the ethanol:water solvent to rise to about 50° C.) The solvent was then filtered through a Whatman #1 filter and evaporated to dryness. The solid residue was weighed and the solution was found to be about 1.4% soluble.

EXAMPLE 3

This example shows the invention used on Nafion PFSI and using dimethylformamide as the solvent.

A 0.5 gram sample of a sulfonic acid Nafion perfluorosulfonate ionomer (proton form) having an equivalent weight of about 1100 was contacted with about 89.3 grams of a 50:50 ethanol:water mixture at a temperature of about 250° C. at a pressure of about 800 pounds per square inch to dissolve the PFSI, thereby forming a first solution. The PFSI solution was then filtered through a Whatman #1 paper filter to remove any undissolved polymer. This produced a 0.428 w/v % solution of the PFSI.

The solution was then neutralized by adding about 7.8 grams of a 0.05 Molar NaOH solution to convert the PFSI into its sodium form. This solution was heated to about 60° C. allowing the solvent to completely evaporate subsequently forming a brittle film. The PFSI was then removed and ground at room temperature into a fine white powder.

The film was then used according to the method of the present invention to form a film. A 50 milligram sample of the PFSI powder was added to 10 milliliters of DMF and then agitated in an ultrasonic bath for about 30 minutes to promote dissolution of the polymer. The temperature of the PFSI solution rose to about 40° C. during this procedure.

The DMF was completely evaporated at a temperature of about 165° C. leaving the PFSI behind in an evaporation container. The PFSI was in the form of a film which was clear, pliant, mechanically stable and could be removed from the walls of the evaporation vial as a coherent film. The solubility of the PFSI film was assessed quantitatively by immersion of the solution processed film in 10 milliliters of a 50:50 ethanol:water solution with agitation from an ultrasonic bath for 1 hour. (Ultrasonication caused the temperature of the ethanol:water solvent to rise to about 50° C.) The solvent was then filtered through a Whatman #1 filter and evaporated to dryness. The solid residue was weighed and the PFSI was found to be about 3.8% soluble.

EXAMPLE 4

This example shows the invention used on Nafion PFSI and using ethylene glycol as the solvent.

A 0.5 gram sample of a sulfonic acid Nafion perfluorosulfonate ionomer (proton form) having an equivalent weight of about 1100 was contacted with about 89.3 grams of a 50:50 ethanol:water mixture at a temperature of about 250° C. at a pressure of about 800 pounds per square inch to dissolve the PFSI, thereby forming a solution. The PFSI solution was then filtered through a Whatman #1 paper filter to remove any undissolved polymer. This produced a 0.428 w/v % solution of the PFSI.

The solution was then neutralized by adding about 7.8 grams of a 0.05 Molar NaOH solution to convert the PFSI into its sodium form. This solution was heated to about 60° C. allowing the solvent to completely evaporate subsequently forming a brittle film. The PFSI was then removed and ground at room temperature into a fine white powder.

The PFSI was then used in the method of the present invention to form a film. A 50 milligram sample of the PFSI powder was added to 10 milliliters of ethylene glycol and then agitated in an ultrasonic bath for about 30 minutes to promote dissolution of the polymer. The temperature of the PFSI solution rose to about 40° C. during this procedure.

The ethylene glycol was completely evaporated at a temperature of about 185° C. leaving the PFSI behind. The PFSI was in the form of a film which was clear, pliant, mechanically stable and could be removed from the walls of the evaporation vial as a coherent film. The solubility of the PFSI film was assessed quantitatively by immersion of the solution processed film in 10 milliliters of a 50:50 ethanol:water solution with agitation from an ultrasonic bath for 1 hour. (Ultrasonication caused the temperature of the ethanol:water solvent to rise to about 50° C.) The solvent was then filtered through a Whatman #1 filter and evaporated to dryness. The solid residue was weighed and the PFSI was determined to be about 6.5% soluble.

We claim:

1. A method for forming a perfluorosulfonate ionomer film comprising:
   (a) forming a solution of a perfluorosulfonate ionomer in its salt form;
   (b) coating a substrate with the perfluorosulfonate ionomer solution; and
   (c) heating the coated substrate to a temperature of at least about 120° C. for sufficient time to deposit a solvent-resistant film of a perfluorosulfonate ionomer onto the substrate.

2. The method of claim 1 wherein the perfluorosulfonate ionomer is a copolymer of a first repeating unit selected from a first group of monomers and a second repeating unit selected from a second group of monomers wherein the first group of monomers is represented by the general formula:

$$CF_2=CZZ'$$

where:
Z and Z' are independently selected from the group consisting of $-H$, $-Cl$, $-F$, or $-CF_3$; and
the second group of monomers is represented by the general formula:

$$Y-(CF_2)_a-(CFR_f)_b-(CFR_{f'})_c-O-[CF(CF_2X)-CF_2-O]_n-CF=CF_2$$

where:
Y is selected from the group consisting of $-SO_2OA$;
A is $-H^+$, an alkali metal, or $-R_1R_2R_3R_4N^+$;
$R_1$, $R_2$, $R_3$, and $R_4$ are independently selected from the group consisting of $-H^+$, a branched or linear alkyl radical having from 1 to about 10 carbon atoms or an aryl radical;
a is 0–6;
b is 0–6;
c is 0 or 1;
provided a+b+c is not equal to 0;
X is $-Cl$, $-Br$, $-F$, or mixtures thereof when $n>1$;
n is 0 to 6; and
$R_f$ and $R_{f'}$ are independently selected from the group consisting of $-F$, $-Cl$, perfluoroalkyl radicals having from 1 to about 10 carbon atoms and fluorochloroalkyl radicals having from 1 to about 10 carbon atoms.

3. A method for forming a perfluorosulfonate ionmer film comprising:
   (a) forming a solution of a perfluorosulfonate inomer in its salt form:
   (b) coating a substrate with the perfluorosulfonate ionomer solution; and
   (c) heating the coated substrate to a temperature of at least about 20° C. for sufficient time to deposit a solvent-resistant film of a perfluorosulfonate ionomer onto the substrate.
   wherein the perfluorosulfonate ionomer is a copolymer of a first repeating unit selected from a first group of monomers, a second repeating unit selected from a second group of monomers, and a third repeating unit selected from a third group of monomers;
   wherein the first group of monomers is represented by the general formula:

$$CF_2=CZZ'$$

where:
Z and Z' are independently selected from the group consisting of $-H$, $-Cl$, $-F$, or $-CF_3$; and
the second group of monomers is represented by the general formula:

$$Y-(CF_2)_a-(CFR_f)_b-(CFR_{f'})_c-O-[CF(CF_2X)-CF_2-O]_n-CF=CF_2$$

where:
Y is selected from the group consisting of $-SO^2OA$;
A is $-H+$, an alkali metal, or $-R_1R_2R_3R_4N+$;

$R_1$, $R_2$, $R_3$, and $R_4$ are independently selected from the group consisting of $-H+$, a branched or linear alkyl radical having from 1 to about 10 carbon atoms or an aryl radical;

a is 0-6;
b is 0-6;
c is 0 or 1;
provided a+b+c is not equal to 0;
X is —Cl, —Br, —F, or mixtures thereof when n>1;
n is 0 to 6; and
$R_f$ and $R_f'$ are independently selected from the group consisting of —F, —Cl, perfluoroalkyl radicals having from 1 to about 10 carbon atoms and fluorochloroalkyl radicals having from 1 to about 10 carbon atoms and the third group of monomers is represented by the general formula:

$$Y'-(CF_2)_{a'}-(CFR_f)_{b'}-(CFR_{f'})_{c'}-O-[CF(CF_2X')-CF_2O]_{n'}-CF=CF_2$$

where:
Y' is —F, —Cl or —Br;
a' and b' are independently 0-3;
c is 0 or 1;
provided a'+b'+c' is not equal to 0;
n' is 0-6;
$R_f$ and $R_f'$ are independently selected from the group consisting of —Br, —C;, —F, perfluoroalkyl radicals having from about 1 to about 10 carbon atoms, and chloroperfluoroalkyl radicals having from 1 to about 10 carbon atoms; and
X' is —F, —Cl, —Br, or mixtures thereof when n'>1.

4. A method for forming a perfluorosulfonate ionomer film comprising:
(a) forming a solution of a perfluorosulfonate ionomer in its salt form;
(b) coating a substrate with the perfluorosulfonate ionomer solution; and
(e) heating the coated substrate to a temperature of at least about 120° C. for sufficient time to deposit a solvent-resistant film of a perfluorosulfonate ionomer onto the substrate
wherein the perfluorosulfonate ionomer is a copolymer of a first repeating unit selected from a first group of monomers and a second repeating unit selected from a second group of monomers wherein the first group of monomers is represented by the general formula:

$CF_2=CZZ'$ where:
Z and Z' are independently selected from the group consisting of —H, —Cl, —F, or —CF_3; and
the second group of monomers is represented by the general formula:

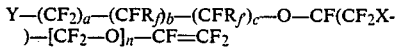

where:
Y is selected from the group consisting of —SO_2OA;
A is —H+, an alkali metal, or —$R_1R_2R_3R_4N+$;
$R_1$, $R_2$, $R_3$, and $R_4$ are independently selected from the group consisting of —H+, a branched or linear alkyl radical having from 1 to about 10 carbon atoms or an aryl radical;

a is 0-6;
b is 0-6;
c is 0 or 1;
provided a+b+c is equal to 2 or 3;
X is —Cl, or —F;
n is 0 or 1; and
$R_f$ and $R_f'$ are —F.

5. The method of claim 1 wherein the solvent is selected form the group of solvents consisting of N,N'-dimethylformamide (DMF), dimethylsulfoxide (DMSO), N-methyl pyrrolidone, triphenylphosphate, tetramethyl urea, dimethylacetamide, sulfolane, butyrolactone and ethylene glycol.

6. A method for forming a perfluorsulfonate ionomer film comprising:
(a) forming a solution of a perfluorosulfonate ionomer in its salt form;
(b) coating a substrate with the perfluorosulfonate ionomer solution; and
(c) heating the coated substrate to a temperature of at least about 120° C. for sufficient time to deposit a solvent-resistant film of a perfluorosulfonate ionomer onto the substrate
wherein the solvent is selected form the group of solvents consisting of N,N'-dimethylformamide (DMF), dimethylsulfoxide (DMSO), N-methyl pyrrolidone, triphenylphosphate, tetramethyl urea, dimethylacetamide, sulfolane, butyrolactone and ethylene glycol and
wherein water is present in the solvent to enhance dissolution of the polymer.

7. The method of claim 1 wherein the perfluorosulfonate ionomer in the solution has a concentration of from about 0.01 to about 8 weight/volume percent.

8. The method of claim 1 wherein the perfluorosulfonate ionomer in the solution has a concentration of from about 0.5 to about 3 weight/volume percent.

9. The method of claim 1 wherein the solution also includes a co-solvent selected from the group consisting of $C_1$ to $C_{12}$ alcohols, 2-methoxyethanol, 2-ethoxyethanol, ethylene glycol dimethyl ether, ethylene glycol diethyl ether, diethylene glycol dimethyl ether, diethylene glycol diethyl ether, dioxane, and acetonitrile.

10. The method of claim 5 wherein the solution also includes a co-solvent selected from the group consisting of $C_1$ to $C_{12}$ alcohols, 2-methoxyethanol, 2-ethoxyethanol, ethylene glycol dimethyl ether, ethylene glycol diethyl ether, diethylene glycol dimethyl ether, diethylene glycol diethyl ether, dioxane, and acetonitrile.

11. The method of claim 1 wherein the substrate is selected from the group of materials consisting of wire mesh, ceramics, cloth fabrics, ion exchange membranes, and porous diaphragms.

12. The method of claim 1 wherein the fabric is made at least in part of perhalocarbon fibers or glass fibers.

13. The method of claim 1 wherein the coating is applied to the substrate a plurality of times.

14. The method of claim 1 wherein the coating is painted onto the substrate.

15. The method of claim 1 wherein the coating is sprayed onto the substrate.

16. The method of claim 5 wherein the solvent is DMF and the coated substrate is heated to a temperature of about 120° to about 165° C.

17. The method of claim 5 wherein the solvent is DMSO and the coated substrate is heated to a temperature of about 165° to about 185° C.

18. The method of claim 5 wherein the solvent is ethylene glycol and the coated substrate is heated to a temperature of about 180° to about 190° C.

19. The method of claim 1 including the step of removing at least a portion of the solvent at a temperature of less than 120° C. prior to heating the coated substrate to a temperature of at least about 120° C.

20. The method of claim 1 including reducing the pressure on the atmosphere during the time the coated substrate is heated to less than 120° C.

* * * * *

UNITED STATES PATENT AND TRADEMARK OFFICE
CERTIFICATE OF CORRECTION

PATENT NO. : 4,731,263
DATED : March 15, 1988
INVENTOR(S) : Charles R. Martin and Robert B. Moore, III It is certified that error appears in the above-identified patent and that said Letters Patent is hereby corrected as shown below:

Col. 1, line 65; indent paragraph "(c)" under paragraph "(b)".

Col. 2, line 55; change "$R_f,$" to --$R_{f'}$--.

Col. 2, line 63; change "$R_f$" to --$R_{f'}$--.

Col. 3, line 1; change "-$OK^{31}$" to -- -$OK^-$ --.

Col. 3, line 16; change 2nd occurrence of "$R_f$" to --$R_{f'}$--.

Col. 3, line 17; delete "2", thereby changing "$CF_2 2$" to --$CF_2$--.

Col. 3, line 25; change 2nd occurrence of "$R_f$" to --$R_{f'}$--.

Col. 8, line 16; change 2nd occurrence of "$R_f$" to --$R_{f'}$--.

Col. 8, line 32; change "$R_f,$" to --$R_{f'}$--.

Col. 8, line 37, Claim 3; change "ionmer" to --ionomer--.

Col. 8, line 44, Claim 3; change "20 C" to --120 C--.

Col. 8, line 63, Claim 3; change 2nd occurrence of "$R_f$" to --$R_{f'}$--.

Col. 8, line 67, Claim 3; change "-$SO^2 OA$" to -- -$SO_2 OA$ --.

Col. 9, line 11, Claim 3; change 2nd occurrence of "$R_f$" to --$R_{f'}$--.

Col. 9, line 19, Claim 3; change 2nd occurrence of "$R_f$" to --$R_{f'}$--.

Col. 9, line 28, Claim 3; change 2nd occurrence of "$R_f$" to --$R_{f'}$--.

UNITED STATES PATENT AND TRADEMARK OFFICE
CERTIFICATE OF CORRECTION

PATENT NO. : 4,731,263

DATED : March 15, 1988

INVENTOR(S) : Charles R. Martin and Robert B. Moore, III

It is certified that error appears in the above-identified patent and that said Letters Patent is hereby corrected as shown below:

Col. 9, line 40, Claim 4; change "(e)" to --(c)--.

Col. 9, line 41, Claim 4; change "deposite" to --deposit--.

Col. 9, lines 59-60, Claim 4; change
"$Y-(CF_2)_a-(CFR_f)_b-(CFR_f)_c-O-CF(CF_2X)-[CF_2-O]_n-CF=CF_2$" to
--$Y-(CF_2)_a-(CFR_f)_b-(CFR_{f'})_c-O-[CF(CF_2X)-CF_2-O]_n-CF=CF_2$--.

Col. 10, line 7, Claim 4; change 2nd occurrence of "$R_f$" to --$R_{f'}$--.

Col. 10, line 21, Claim 6; change "deposite" to --deposit--.

Signed and Sealed this

Fourteenth Day of March, 1989

Attest:

DONALD J. QUIGG

*Attesting Officer*  *Commissioner of Patents and Trademarks*